No. 714,795. Patented Dec. 2, 1902.
A. H. GRAVES.
HAY RAKE AND STACKER.
(Application filed Feb. 8, 1902.)
(No Model.) 3 Sheets—Sheet 1.
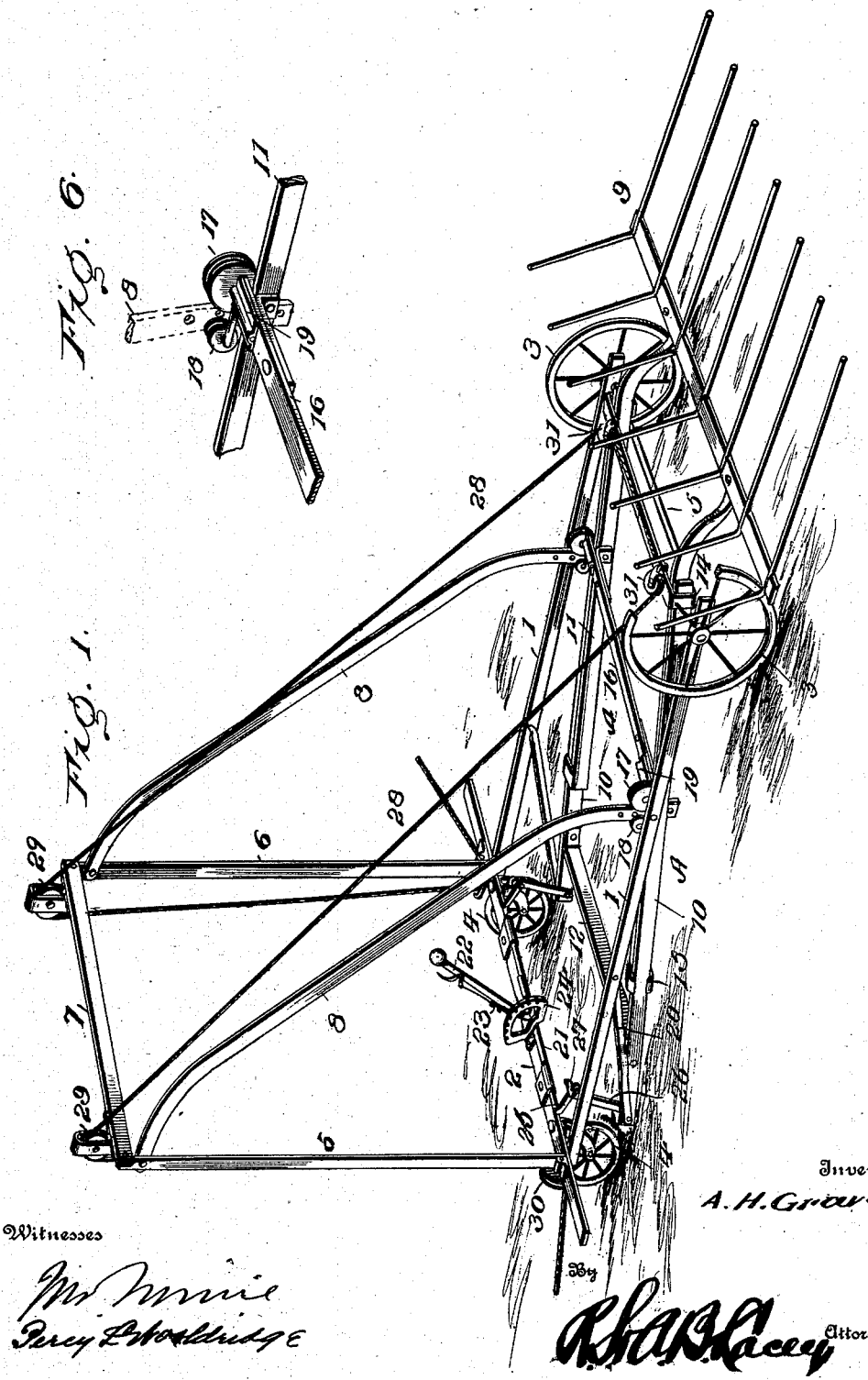
Witnesses
Inventor
A. H. Graves

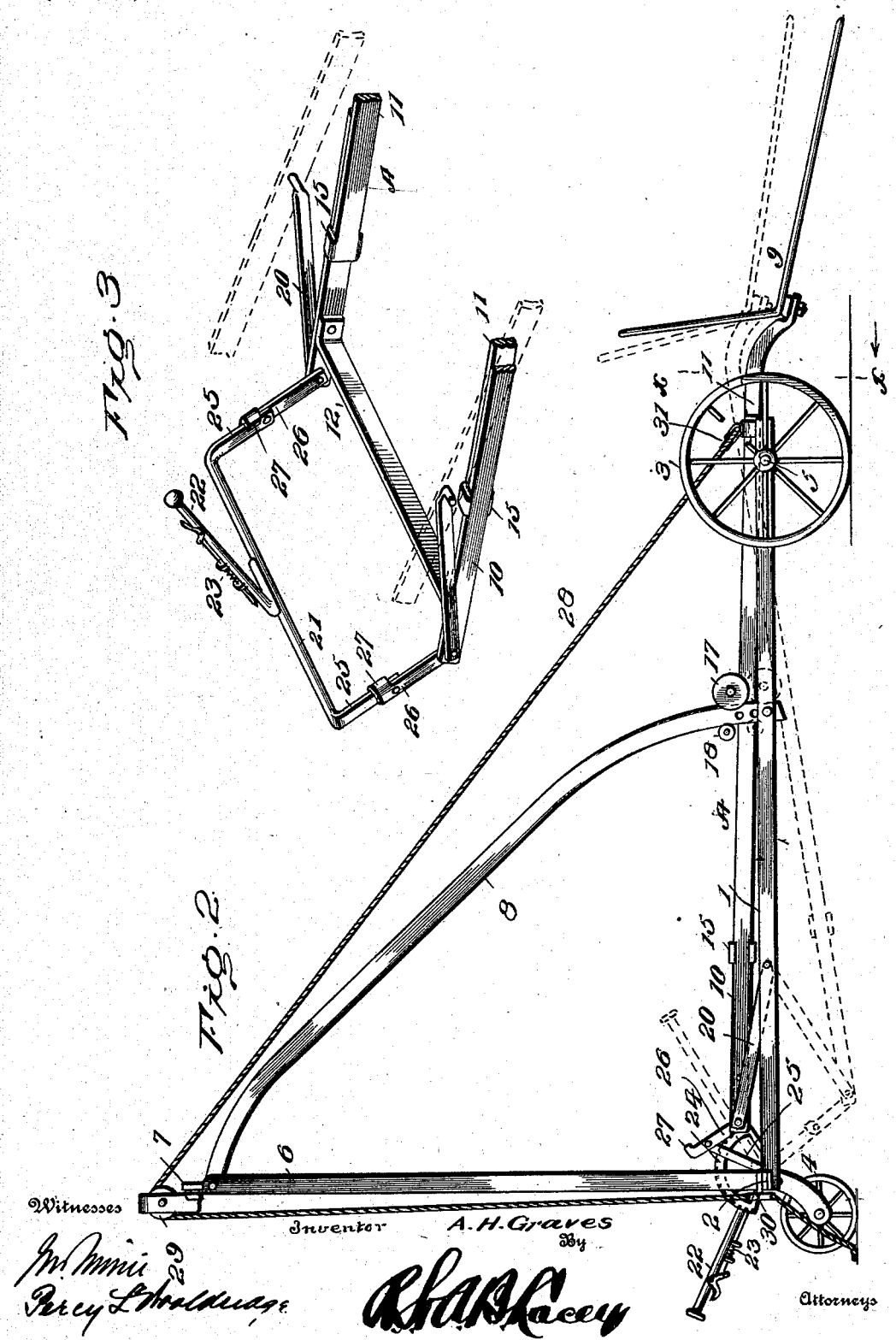

No. 714,795. Patented Dec. 2, 1902.
A. H. GRAVES.
HAY RAKE AND STACKER.
(Application filed Feb. 8, 1902.)
(No Model.) 3 Sheets—Sheet 3.
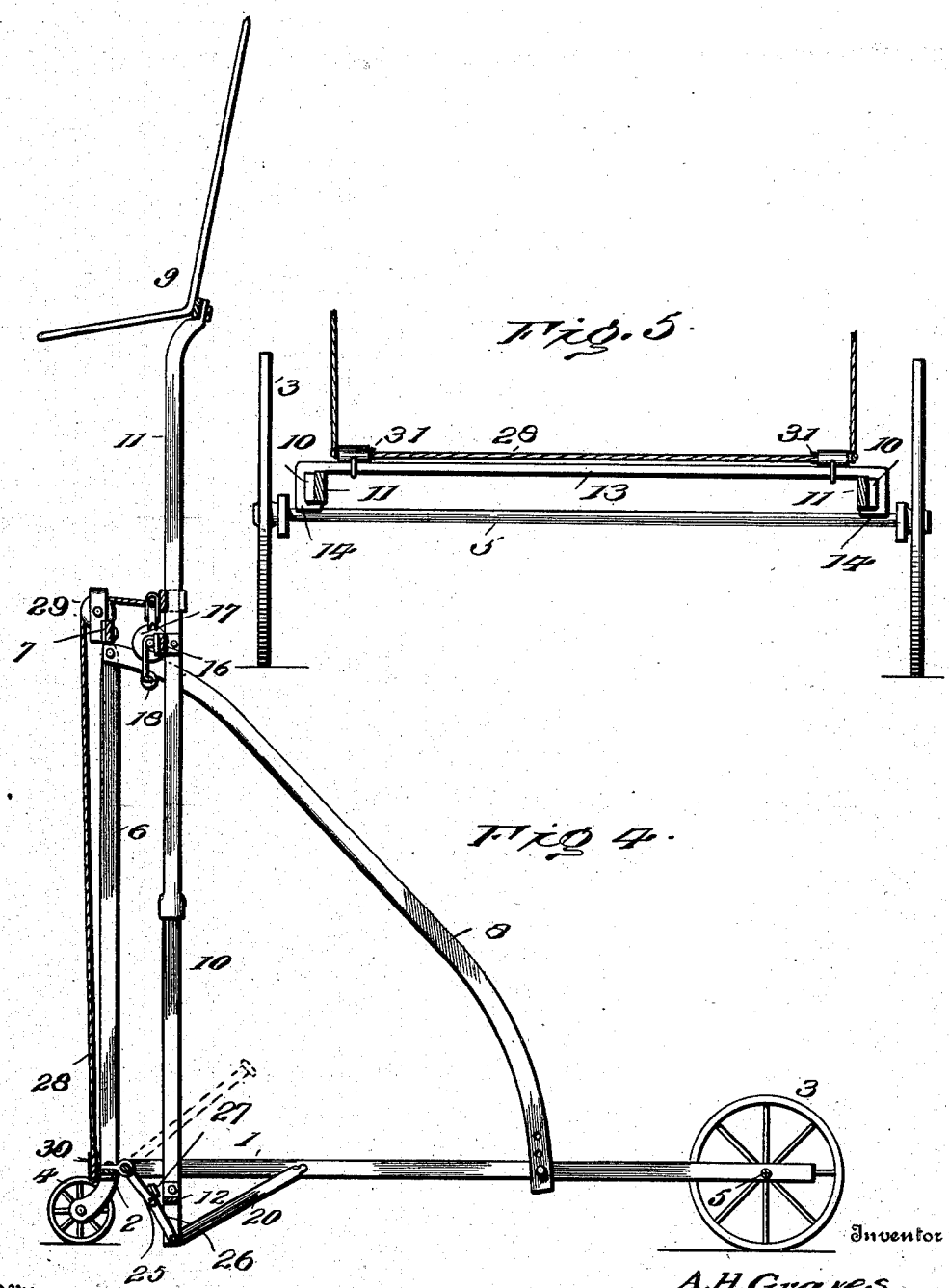
Witnesses
Inventor
A.H. Graves
By 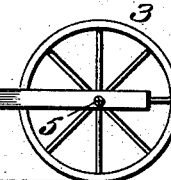
Attorneys

UNITED STATES PATENT OFFICE.

ANDREW H. GRAVES, OF LAMONI, IOWA.

HAY RAKE AND STACKER.

SPECIFICATION forming part of Letters Patent No. 714,795, dated December 2, 1902.

Application filed February 8, 1902. Serial No. 93,168. (No model.)

*To all whom it may concern:*

Be it known that I, ANDREW H. GRAVES, a citizen of the United States, residing at Lamoni, in the county of Decatur and State of Iowa, have invented certain new and useful Improvements in Hay Rakes and Stackers; and I do hereby declare the following to be a full, clear, and exact description of the invention, such as will enable others skilled in the art to which it appertains to make and use the same.

This invention has relation to machines specially designed for stacking hay, grain, and the like, the purpose being to improve the general structure and to provide an implement for the purpose aforesaid which will be simple in construction, effective in operation, and easy of manipulation.

In its organization the machine comprises a rake or load-lifter, carrying-arms therefor comprising sliding members, manually-operated means for tilting the said arms to raise and lower the rake for convenience in receiving the load, curved guides for directing the rake in its pivotal movements and adapted to automatically lengthen and shorten the aforesaid arms, and actuating means for operating the rake to effect a dumping of the load upon the stack.

The invention also consists of the novel features, details of construction, and combinations of the parts which hereinafter will be more particularly set forth, illustrated, and finally embodied in the subjoined claims.

In the drawings hereto attached and forming a part of the specification, Figure 1 is a perspective view of a machine embodying the invention. Fig. 2 is a side elevation thereof, the rake being shown lowered by full lines and lifted by dotted lines. Fig. 3 is a perspective view of the means for tilting the arms of the rake to effect a raising and lowering thereof, as shown by the full and dotted lines in Fig. 2. Fig. 4 is a longitudinal section showing the rake elevated as it will appear when discharging the load upon the stack. Fig. 5 is a transverse section about on the line x x of Fig. 2 looking in the direction of the arrow. Fig. 6 is a detail perspective view of the guide-rollers for the rake-arms and the contiguous parts.

Corresponding and like parts are referred to in the following description and indicated in all the views of the drawings by the same reference characters.

The frame may be of any construction and, as shown, comprises longitudinal beams 1 and a connecting cross-bar 2 and is supported upon ground-wheels 3 and caster-wheels 4, the latter being applied to the cross-bar 2. The ground-wheels 3 are applied to the ends of the axle 5, which is mounted near its ends in the beams 1 near their front extremities. Posts 6 rise vertically from the rear corners of the frame and are joined at their upper ends by a cross-bar 7. Guides 8 connect the upper ends of the post 6 with the longitudinal beams 1 and have their end portions curved. The guides 8 strengthen and brace the parts 1 and 6 and also act to lengthen the arms carrying the rake or load-lifter 9. The axle 5 at the end of the machine forms a tie for and braces the beams 1 and, in conjunction with the cross-bar 2, forms a tie for the longitudinal members of the frame.

The rake or load-lifter 9 is firmly attached to the arms A, composed of sliding parts or braces 10 and 11, mounted to tilt upon the axle 5, so as to effect a raising and lowering of the rake, as shown by the full and dotted lines in Fig. 2. The sections 10 are connected near their rear ends by a cross-bar 12 and at or near their front ends by a cross-bar 13, the end portions of which are bent, as shown at 14, to embrace the sections 10 and 11, as shown most clearly in Fig. 5. The sections 11 have wings 15 at their inner or rear ends to embrace the upper and lower edges of the sections 10, so as to support the said sections 11 and give proper direction thereto in the lengthening and shortening of the arms due to the sliding movements of the parts 11. The forward ends of the sections 11 are curved downward and the rake-head is rigidly attached thereto. A cross-bar 16 connects the parts 11 intermediate of their ends and is provided with a pair of pulleys at each end, the pulleys 17 being of larger diameter than the pulleys 18, and both series of pulleys are grooved to receive the upper and lower edges of the guides 8. The smaller pulleys 18 are arranged to travel upon the lower edge of the guides 8, thereby enabling the rake to have a maximum range of movement when being elevated to deliver the load upon the stack and lowered to the position shown by the dotted lines in Fig. 2. The pulleys 17 and 18 are loosely mounted upon journals of a bracket 19, fitted to each end of the cross-bar 16.

The arms A are supported near their front ends by the axle 5, and their rear ends are connected by links 20 with the beams 1 a short distance from their rear ends. A rock-shaft 21 is journaled to the cross-bar 2 and is provided with an operating-lever 22, having a hand-latch 23 for coöperation with a notched segment 24, attached to the cross-bar 2 for holding the rock-shaft in an adjusted position. The ends of the rock-shaft are bent, as shown at 25, and are pivotally connected to links 26, having pivotal attachment to the rear ends of the pivoted arms A. The links 26 have inner extensions 27, forming stops to engage with the bent ends or arms 25 of the rock-shaft and hold the parts 25 and 26 in alinement, as shown most clearly in Fig. 3 and by the dotted lines in Fig. 2. In one position of the lever 22 the arms A are lowered at their rear ends and raised at their front ends, as shown by the dotted lines in Fig. 2, and in the other extreme position of the said lever the arms A occupy an approximately horizontal position and the rake is lowered, so as to rest upon the ground for convenience of receiving the load, as shown by the full lines in Fig. 2.

The machine is moved from place to place by running upon ground-wheels 3 and caster-wheels 4, the draft being applied thereto in any convenient way. When positioned for use and it being required to load the rake, the lever 22 is operated to lower the rake into the position shown by full lines in Fig. 2, and after the load is received thereon the lever 22 is again operated to raise the rake to the position shown by dotted lines in Fig. 2, the inner ends of the arms A being in a position to be supported by the ground and the connections 25, 26, and 20 oppositely inclining and mutually bracing each other, as indicated by the dotted lines in Fig. 2. After the rake has been loaded it is elevated to deposit the hay or grain upon the stack by means of cords or ropes 28, which pass over guide-pulleys 29 at the upper end of the vertical frame, comprising the post 6 and cross-bar 7, thence around other direction-pulleys 30 at the lower end of said vertical frame to be hitched to the operating power in any preferred manner. Inasmuch as it is common to hitch the ends of the cords 28 to a draft-animal or team and in order to compensate for any difference in movement of the animals, it is preferred that the cords or ropes 28 constitute parts of a single line which passes around guide-pulleys 31 near the outer or front ends of the pivoted arms A. It will thus be seen that the cord or rope is free to adapt itself to any difference in movement of the ends thereof by reason of the system of direction-pulleys shown and described. When the cords or ropes 28 are drawn together, the rake 9 is elevated and the pulleys 17 and 18 travel upon guides 8 and simultaneously with the elevation of the rake the arms are gradually extended until when the rake is approximately in a perpendicular position the arms are extended to their utmost limit. Upon slacking the cords or ropes 28 the rake will automatically assume a normal position by gravitative force, resulting from superior weight in the rear of the rake when elevated, the parts being so disposed as to prevent movement of the rake past a vertical plane extending through the center of gravity.

Having thus described the invention, what is claimed as new is—

1. In combination, a rake or load-lifter, an extensible support therefor, means for raising and lowering the rake, and a guide for directing the rake in its movements and simultaneously extending or contracting the support therefor, substantially as specified.

2. In combination, a rake or load-lifter, an extensible support therefor, means for raising and lowering the rake, and an inclined guide having its end portions curved for directing the rake in its movements and simultaneously effecting a lengthening or a shortening of the aforementioned support, substantially as set forth.

3. In combination, an approximately horizontal frame, a substantially vertical frame, a guide between the two frames likewise serving to brace the same, a pivotal support provided with a rake or load-lifter and directed in its pivotal movements by the said guide, and actuating means therefor, substantially as set forth.

4. In combination, frames disposed approximately at a right angle to each other, guides bracing the frames, a pivotal support provided with a rake or load-lifter and comprising extensible sections, engaging means between the movable sections and the said guides, and actuating means for operating the pivotal support, the parts being combined to effect a simultaneous elevation of the rake and extension of its pivotal support, substantially as set forth.

5. In combination, a pivotal support comprising extensible sections, a rake or load-lifter applied to the outermost section, means for adjustably supporting the inner or rear end of the pivotal support, a guide, coöperating means between the guide and outermost section of the pivotal support, and operating means for elevating the rake to dump the load, the sections of the pivotal support being simultaneously extended, substantially as specified.

In testimony whereof I affix my signature in presence of two witnesses.

ANDREW H. GRAVES. [L. S.]

Witnesses:
JOHN W. TONY,
E. D. BRIGGS.